L. M. WOLFFSOHN (NOW BY JUDICIAL CHANGE OF NAME L. M. WOOLSON).
ELECTRIC SYSTEM FOR MOTOR VEHICLES AND THE LIKE.
APPLICATION FILED APR. 30, 1917.

1,393,596.  Patented Oct. 11, 1921.
2 SHEETS—SHEET 1.

UNITED STATES PATENT OFFICE.

LIONEL M. WOLFFSOHN, (NOW BY JUDICIAL CHANGE OF NAME LIONEL M. WOOLSON,) OF UNION, NEW JERSEY, ASSIGNOR, BY MESNE ASSIGNMENTS, TO BIJUR MOTOR APPLIANCE COMPANY, A CORPORATION OF DELAWARE.

ELECTRIC SYSTEM FOR MOTOR-VEHICLES AND THE LIKE.

1,393,596.   Specification of Letters Patent.   Patented Oct. 11, 1921.

Application filed April 30, 1917. Serial No. 165,307.

*To all whom it may concern:*

Be it known that I, LIONEL M. WOLFFSOHN, (now by judicial change of name LIONEL M. WOOLSON,) a citizen of the United States, and a resident of the town of Union, county of Hudson and State of New Jersey, have invented an Improvement in Electric Systems for Motor-Vehicles and the like, of which the following is a specification.

This invention relates to electrical systems, and more particularly to the electrical equipment for motor vehicles propelled by internal combustion engines.

One of the objects thereof is to provide practical means of the above type, of enhanced simplicity and efficiency for generating and distributing electrical energy of characteristics automatically and properly responsive to different conditions of operation of the system.

Another object is to provide ignition apparatus of simple and relatively inexpensive construction, yet dependable and economical under all conditions of operation.

Another object is to provide simple, effective and sensitive means of rugged construction, to automatically bring about proper operation of the electrical equipments under all temperature conditions.

Another object is to provide apparatus of the type described, simple in construction and whose manner of operation will bring about a long period of usefulness.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

This invention is an improvement of that disclosed in my copending application, Serial No. 24,846, filed April 30th, 1915, and patented on September 24th, 1918, as Patent No. 1,279,816.

Figure 1:
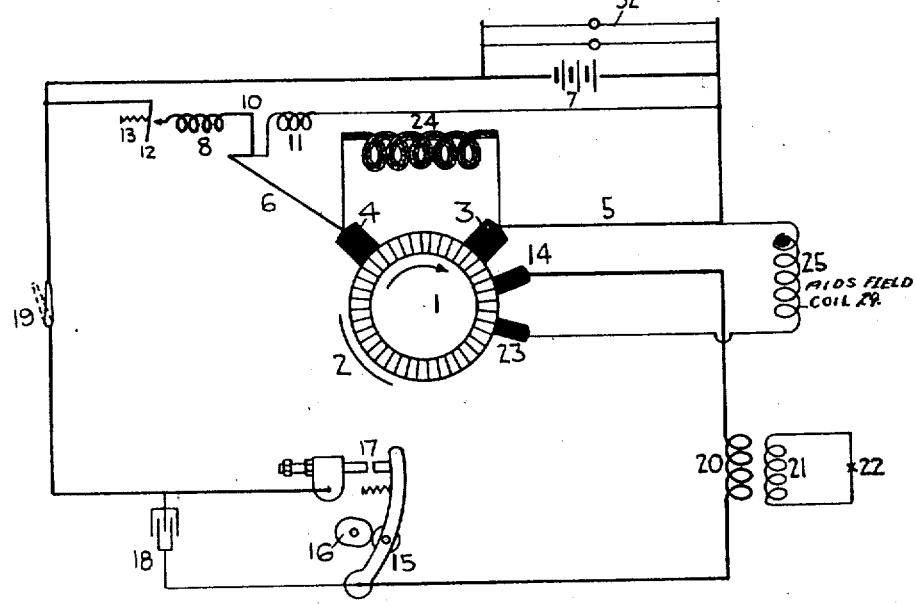
Figure 2:
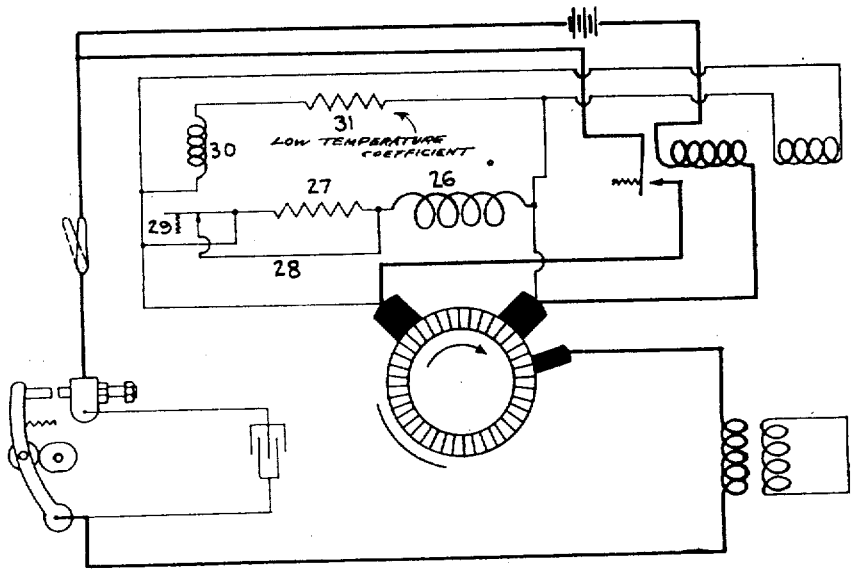
Figure 3:
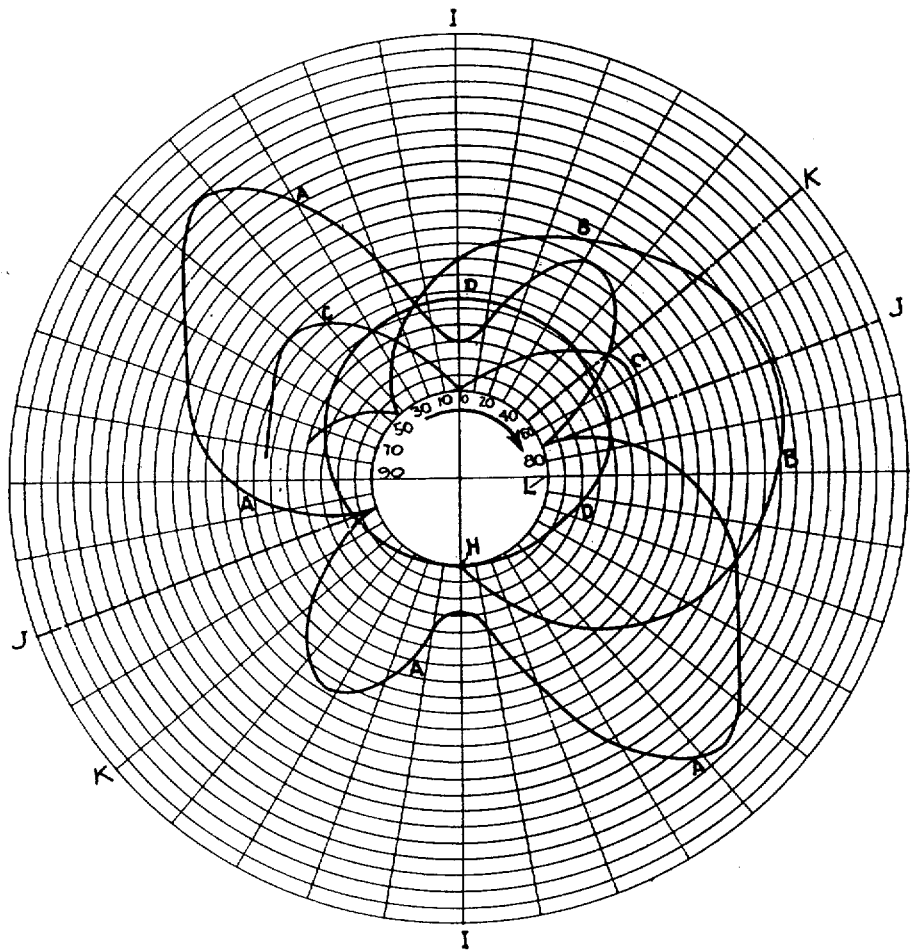

In the accompanying drawings in which is shown one or more various possible embodiments of the several features of this invention, Figure 1 is a diagrammatic plan of one embodiment of my invention. Fig. 2 is a similar view of a modified form thereof and Fig. 3 is a chart in polar coördinates of various output curves of the generator.

Similar reference characters refer to similar parts throughout the different views of the drawings.

Referring now to Fig. 1 of the drawings, there is shown at 1 the commutator of an electric generator indicated at 2, this generator being driven from an internal combustion engine and shown to perform the functions hereinafter described. Generator 2 is herein indicated as of the four pole type with wave-wound armature, the main brushes being thus spaced about 90° and being indicated at 3 and 4. From these brushes which are fixed substantially at the neutral points on low speed of operation of the generator, there are led conductors 5 and 6, conductor 5 leading directly from brush 3 to one terminal of the storage battery 7 and conductor 6 leading to the series coil 8 of the automatic switch 10, the shunt coil 11 of said automatic switch being connected across the main brushes 3 and 4 of the generator. There being no invention in the main switch *per se*, it may be briefly noted that when the generator produces the proper voltage, coil 11 will cause the closure of switch 12 overcoming retractile spring 13 so that the generator is directly connected in charging relation with the storage battery 7, and is further connected in parallel with the battery to send current to translating devices 32 which may be placed in circuit by closing their respective switches (not shown). When the main switch is closed, the main current will pass through series coil 8 which coil aids the shunt coil in maintaining the switch 12 in closed position. When the voltage of the battery is somewhat higher than that of the generator, there will be a back flow of current from the battery through series coil 8 whereby the series and shunt coils will be in opposition and switch 12 will no longer be held in closed position, being retracted by spring 13, thus preventing the battery from discharging itself by operating the generator as a motor.

In a preferred embodiment the main switch will close when the voltage of the generator is appreciably in excess of that of the battery, and will open when that of the battery is appreciably in excess of that of the generator. This prevents repeated opening and closing around the critical value. Through a small range of voltage, the battery may therefore motor the generator.

An auxiliary brush 14 designated in the following as "ignition brush," is in close proximity to brush 3 but not so close as to have the same potential, the adjacent sides of said brushes being preferably spaced from each other by somewhat more than the width of one and less than the width of two commutator bars, and brush 14 being on that side of brush 3 toward which the generator rotates. Connected between main brush 4 and ignition brush 14, there is shown a conventional ignition circuit 15, the cam driven from the engine being shown at 16 and the interrupter contacts 17 shunted by the customary condenser 18 being adapted to be placed in operative relation by the closure of the manually operated switch 19. The usual primary coil 20 is in series with contacts 17 and in inductive relation with secondary coil 21 leading to spark plug 22. It is to be understood that the invention does not reside in the details of the ignition circuit just described and it should be noted that either a separate coil may be used for each spark plug, or a single coil and distributer may be employed.

By disposing the ignition circuit as described above and shown, regardless of the form of generator and regulator employed, I obtain the remarkable and useful result that the voltage across brushes 4 and 14 will at low speeds of the generator be not materially lower than that between the main brushes, and will increase with speed to values far in excess of the voltage of the generator. It may here be noted that as the engine speeds up, and the ignition breaks occur with greater frequency, the sparks would become less effective owing to insufficient time for building up of flux in the core of coil 20. The ignition circuit is thus one of an impedance varying with speed, the word "impedance" being used in its broad sense as opposition due to self-induction or capacity under quickly varying current conditions, whether the current be alternating or direct. The rising voltage above described will effectively offset this difficulty at all speeds, resulting in very efficient ignition, in other words, the ignition current remains substantially constant at all speeds at which the dynamo is generating, that is, the ignition apparatus is connected to the dynamo to draw therefrom a current of a voltage not less than that necessary for proper ignition and responsive to the speed in substantially the same relation as the optimum voltage for ignition varies with the speed of the engine.

For proper operation, I preferably employ a constant current type of regulation for the generator, the preferred form of which is shown in Fig. 1. A shunt field coil 24 is placed across the main brushes 3 and 4 and an additional field coil 25 wound in a direction to aid the shunt field coil 24 is connected between brush 3 and auxiliary brush 23, the latter in a four-pole machine being disposed preferably at an angle of approximately 72 mechanical degrees in a direction of rotation beyond main brush 3. As is well known field 25 acting alone would result in a current output of the machine, dropping with increase of speed. The shunt coil 24 is provided with a sufficient number of turns to produce a current rising with increase of speed substantially sufficiently to compensate for the dropping characteristic due to shunt coil 25, so that the current output of the machine will be substantially constant for all speeds of operation.

The disposition of field coils just described, besides producing a current substantially constant under all speeds of operation, brings about another very useful feature of automatic regulation, namely, a decrease of current output with increase of temperature. Below, I have described some of the uses of this type of regulation. To more clearly explain the reasons for this manner of operation, I have the following theory, which, it is to be understood, is merely tentative and subject to modification.

When the machine becomes heated, owing to any cause, coil 24 across which the battery 7 maintains a substantially constant voltage at various speeds gradually becomes warmer, and the resistance of this field coil will automatically increase so that the current therethrough will decrease. The current output of the generator must therefore gradually decrease with increase of temperature. As regards this feature of operation, the action of the coil 25 may apparently be substantially disregarded as the voltage thereacross and current therethrough, always relatively low, will become even lower upon increasing speeds so that the heating effect is substantially negligible compared to that of field coil 24.

By this automatic decrease of current output of the generator with increasing temperatures, I materially lengthen the life and improve the operation of the ignition apparatus. This will be readily understood when it is considered that the engine and the generator will normally heat up together and the warm engine will operate efficiently on the feebler spark resulting from the weaker current produced by the warm generator.

In addition to this, it is to be noted that the current output regulated according to temperature as described will be properly adapted to all climates and conditions of operation. In warm weather, when the battery needs less current, due to increased relative use of car in daylight driving, the machine will automatically protect it against damage due to overcharge by generating a smaller current, thus lengthening the life of the battery. On the other hand, when the weather is cold, the charging current for the battery will be correspondingly heavy substantially in accordance with the current necessary to keep the battery charged. For intermediate temperatures, the current will be properly graduated between these values.

Though field coil 24 will operate efficiently when insulated in the usual manner, I have shown a preferred form of asbestos insulation in Fig. 1. By this means, the heat developed by current in the field coil will not be dissipated so that the temperature of the coil will increase more rapidly than otherwise, and the automatic temperature regulation is thus made more sensitive.

If coil 25 alone were employed for regulation of the generator, the angular position of brush 23 would as is well known, have to be adjusted with extreme accuracy. With the specific arrangement shown, shunt coil 24 will automatically compensate for inaccuracies in position of brush 23, and no means therefore need be provided for adjusting the position of this brush. It is of course further obvious that coil 25 will not produce the temperature regulation above described, for the reason, among others, that the current therethrough being low at high speeds produces relatively small changes in both excitation of the machine and temperature of the coil.

Referring now to Fig. 2, I have shown an arrangement in general similar to that of Fig. 1, differing chiefly in the use of a separate regulator for constant voltage in place of the inherent constant current regulation, shown in Fig. 1. The commutator, battery, main brushes, ignition circuit and automatic switch are shown substantially the same as in Fig. 1 and need not be further described in detail. For the purpose of voltage regulation, I provide in series with the shunt voltage winding 26 of the generator, a resistance element 27, which is normally shunted by conductor 28, the circuit of which is controlled by a spring retracted contact 29. A generator voltage coil 30 is operatively related to the switching contact 29 and upon the generator reaching a high speed, the coil 30 becomes of such strength that it actuates contact 29 to break the shunt about resistance 27, thus materially weakening the generator field. This action is repeated with a frequency depending upon the generator speed and thus tends to maintain the voltage of the generator output substantially constant. A low temperature coefficient resistance 31 is preferably in series with coil 30.

Though the preferred embodiment of my invention is, in general, that employing a constant current form of generator and specifically that shown in Fig. 1, it is to be understood that there are peculiarly beneficial features of the operation to the form shown in Fig. 2.

For a better understanding of the remarkable and useful increase of voltage across the brushes from which the ignition circuit derives it current to values far in excess of the voltage across the main brushes of the generator, I have carried on investigations, the results of which are clearly shown in Fig. 3. In this figure, the perigon represents 360 electrical degrees extending over a range of 180 mechanical degrees in the machine shown, it being understood that by an "electrical degree" is meant one-three hundred and sixtieth of the angular distance from a neutral point to the next neutral point of like polarity, and that the term "electric quadrant" denotes a space of 90 such electrical degrees.

In this figure, the commutating axis is shown at I—I, and the curves are lettered A, B, C and D respectively. These curves are graphical representations of the following observations:

Curve A. Electro-motive force, for a single armature coil in different positions, at 1450 R. P. M. and 13 amperes external load.

Curve B. Potential between a brush in position H and points on the commutator in different angular positions at 1450 R. P. M and 13 amperes external load.

Curve C. Same as curve A for 350 R. P. M., the machine motoring, and taking 4 amperes.

Curve D. Same as curve B, for 350 R. P. M., the machine motoring and taking 4 amperes.

It is to be noted from Fig. 3 that the commutating axis shown at I—I substantially coincides with the neutral axis at 350 R. P. M., when the machine is motoring. For the higher speed at 1450 R. P. M. with 13 amperes external load, the graph clearly shows that the neutral axis has shifted through an appreciable angle from the commutating axis, and the voltage between a brush in position H, and another point is highest when that other point is on the neutral axis as shown. It appears that the neutral axis gradually shifts with increase of speed from the position of the commutating axis with which it coincides at relatively low speeds to the position shown at JJ for 1450 R. P. M. and 13 amperes external load, and for still higher speeds it shifts still further.

Though it may appear that the ignition brush should be placed on the axis JJ where a maximum voltage is produced at the relatively favorable operating speed of 1450 R. P. M., this does not usually result in the highest degree of efficiency readily attainable, because, for this location of ignition brush, as shown by curve D, the voltage for relatively low speeds of operation would be considerably lower than that between the main brushes. Therefore, if the ignition coils were chosen of proper relative proportions to give an efficient spark at low speeds, the spark would be much too violent at high speeds. For this reason, a more favorable position of the ignition brush is that along axis KK. In this case, it is to be noted that the voltage at 350 R. P. M. when the generator is motoring is not appreciably lower than that across the main terminals of the machine, and as the speed increases, the voltage rises far above that value. With the ignition brush along the axis KK and the circuit connected between said brush and point H, the voltage between said points varies with speed substantially as the voltage demands for proper operation of the ignition apparatus.

It is to be noted that when allowance is made for the width of the main and ignition brushes, the brush along the axis KK and the adjoining main brush have their adjacent sides in proximity to each other. In fact, it is found that with the machine described, the position is that outlined above, that is, that in which the brushes are separated from each other by a width somewhat in excess of that of one commutator bar but less than two commutator bars.

If the ignition brush were placed in the electrical quadrant HL, say for instance, in the position of field brush 23 shown in Fig. 1, it is to be noted that though the voltage would rise with increased speed, such rise would be too rapid assuming that coils of proper proportions were employed for producing efficient ignition at low voltage, or if the coils were so arranged that proper ignition would be produced at high speeds, some additional source of voltage would be needed to produce proper operation at low speeds.

The operation having already been set forth to some detail it need merely be added, that when the main switch is open, the ignition circuit derives its current from the battery. Whenever the main switch is closed, however, the generator produces the desirable current and voltage fully pointed out in the foregoing.

Although I have shown in particular an ignition circuit connected across brushes 4 and 14, it is to be understood that one or more other current-taking devices across which it would be desirable to have the voltage rise with increase of speed could be so connected to advantage, either alone, or in parallel with the ignition circuit described. However, it is to be noted that there are particular advantages in the use of the ignition circuit as shown and described.

It should further be noted, that my invention is not limited in its application to the specific type of generator shown and described, but may be employed advantageously in a variable speed direct current generator of any type whatsoever, in which armature reaction may vary considerably, although there are peculiar advantages to the specific embodiment set forth.

Finally, it is to be observed that the ignition brush need not be located relative to the main brushes in the specific mechanical relation shown. Any location thereof in an electrical relation, deriving the results set forth above, is within the scope of my invention, though from this aspect also there are particularly beneficial results inherent in the specific arrangement shown.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In an electric system of distribution, in combination, a direct current variable speed generator having terminals, means adapted to maintain substantially constant a function of the output of said generator as its speed varies and means so connected to said generator as to draw therefrom at relatively low speeds a current of a voltage substantially that of the generator terminals, and at higher speeds a current of a voltage rising with such speed.

2. In an electric system of distribution, in combination, a variable speed direct current generator, including a commutator, means adapted to maintain substantially constant a function of the output of said generator as its speed varies, and an external circuit connected to said commutator at points between which the potential difference changes from substantially the voltage of the generator terminals to higher values as the magnetic flux through the generator is distorted.

3. In ignition apparatus for internal combustion engines, in combination, a generator, means adapted to maintain substantially constant a function of the output of said generator as its speed varies, an ignition coil connected with said generator, said means for maintaining a function of the output constant acting to weaken the field as the speed of the generator rises and means responsive to the weakening of the field of said generator to cause the voltage upon the circuit of said ignition coil to vary from substantially that of the generator to a higher value.

4. In ignition apparatus for internal combustion engines, in combination, a generator, an external circuit connected with said generator, means adapted to affect said connection under certain conditions, the connection of said external circuit when not so affected being such as to draw therefrom at all speeds a current of a voltage not less than that necessary for proper ignition and responsive to the speed in substantially the same ratio as the optimum voltage for ignition varies with the speed of the engine, and ignition apparatus associated with said external circuit to have impressed thereon a voltage substantially proportional to that of said circuit.

5. In an ignition system for internal combustion engines, in combination, a generator, a battery, means adapted to maintain substantially constant a function of the output of said generator as its speed varies, ignition apparatus, connecting means for joining said apparatus to derive current from said battery under some conditions of operation, and from said generator under others, said means being connected with said generator to draw therefrom a current of a voltage not less than the voltage necessary for proper ignition and, responsive to the speed in substantially the same relation as the optimum voltage for ignition varies with the speed of the engine.

6. In an ignition system for internal combustion engines, in combination, a generator, a battery, connected to be charged by said generator, means adapted to maintain substantially constant a function of the output of said generator as its speed varies, ignition apparatus, connecting means for joining said apparatus to derive current from said generator, automatic means between said generator and said battery adapted to connect said generator to said battery at a voltage higher than that of the battery so that the generator may charge the battery and to disconnect said generator from said battery at a voltage lower than that of the battery to prevent material discharge of said battery through said generator, said connecting means being connected with said generator to draw therefrom a current of a voltage responsive to the speed in substantially the same relation as the optimum voltage for ignition varies with the speed of the engine.

7. In ignition apparatus for internal combustion engines, in combination, a generator, a battery, connected to be charged thereby, means adapted to maintain substantially constant a function of the output of said generator as its speed varies, an automatic switch connected between said generator and said battery and adapted to open when said battery has a substantially higher voltage than said generator, an ignition circuit connected to the battery side of said automatic switch, and said ignition circuit being connected to said generator, to draw therefrom at all times when said switch is closed a current of a voltage responsive to the speed in substantially the same relation as the optimum voltage for ignition varies with the speed of the engine.

8. In an ignition system for internal combustion engines, in combination, a variable speed generator having a commutator, means adapted to maintain substantially constant a function of the output of said generator as its speed varies, brushes coöperating with said commutator at points between which the voltage varies with speed from a voltage substantially that of the generator terminals to higher values in substantially the same ratio as the optimum voltage for ignition varies with the speed of the engine, and ignition apparatus associated with said external circuit, to have impressed thereon a voltage substantially proportional to that of said circuit.

9. In a variable speed generator, in combination, a commutator, main terminals, means adapted to maintain substantially constant a function of the output of said generator, as its speed varies, and brushes coöperating with said commutator at points between which the voltage rises with increase of speed from substantially that between said terminals to values higher than between said terminals.

10. In an electrical system of distribution, in combination, a variable speed generator, regulating means for maintaining one function of its output constant for different speeds, and two collectors connected to take current from the armature of said generator, at points spaced from each other by more than one and less than two electrical quadrants, and between which the voltage rises with increase in speed, and an external circuit between said collectors.

11. In an ignition system for motor vehicle engines, in combination, a variable speed generator, having a commutator, means adapted to maintain substantially constant a function of the output of said generator, as its speed varies, two collectors connected to take current from the armature of said generator at points spaced from each other by more than one and less than two electrical quadrants, one of said collectors being disposed at the neutral axis corresponding to a relatively high speed of said generator, the other collector being on the side thereof toward which said armature rotates, and ignition apparatus connected to derive power from said collectors.

12. In an ignition system for motor vehicle engines, in combination, a variable speed generator having a commutator, two collectors connected to take current from the armature of said generator at points spaced from each other by more than one and less than two electrical quadrants, one of said collectors being disposed at the neutral axis corresponding to low speeds of said generator, the other collector being on the side thereof from which said armature rotates, and ignition apparatus connected to derive electric power from said collectors.

13. In an ignition system for motor vehicle engines, in combination, a variable speed generator, having a commutator, two collectors connected to take current from the armature of said generator, one of said collectors being near the neutral axis for low values of the armature reaction, the other near the neutral axis for a relatively high value of the armature reaction, and ignition apparatus connected to derive electric power from said collectors.

14. In an ignition system for motor vehicle engines, in combination, a variable speed generator, having a commutator, two collectors connected to take current from the armature of said generator, one of said collectors being near the neutral axis for low speeds of the generator, the other near the mean position of the neutral axis for the range of operating speeds of the generator, and ignition apparatus connected to derive electric power from said collectors.

15. In an ignition system for motor vehicle engines, in combination, a variable speed generator, having a commutator, main brushes from which a battery is adapted to be charged, a third brush near the neutral axis for a relatively high speed of said generator, an external circuit connected to said third brush, and to the more remote of the main brushes, and ignition apparatus connected to derive electric power from said external circuit.

16. In an ignition system for motor vehicle engines, in combination, a variable speed generator, having a commutator, main brushes substantially in low speed neutral position, a third brush between the extreme positions of the neutral axis for different operating speeds of the generator, an external circuit connected to said third brush, and to the more remote of the main brushes, and ignition apparatus connected to derive electric power from said external circuit.

17. In an ignition system for motor vehicle engines, in combination, a variable speed generator, having a commutator, main brushes substantially in low speed neutral position, a third brush near the neutral axis for the highest value of the armature reaction, and an external circuit connecting said third brush, and the main brush on the other side of said neutral axis, and ignition apparatus connected to derive electric power from said external circuit.

18. In a motor vehicle ignition generator, in combination, a field, an armature, a commutator, means for maintaining one function of the output, substantially constant for different speeds, two brushes in contact with said commutator substantially at its low speed neutral axis, a third brush in close proximity to and lagging with respect to one of said two brushes, and at a different electrical potential from both said brushes.

19. In ignition apparatus for internal combustion engines, in combination, a variable speed generator, regulating means for maintaining one function of the output of said generator substantially constant for different speeds, said generator having a field, an armature, a commutator, two brushes in contact with commutator bars associated with armature coils cutting minimum flux when the generator is on open circuit, a third brush spaced from one of said brushes by a distance slightly in excess of the width of one commutator bar, and on the side thereof toward which said armature rotates, and an ignition circuit connected between said third brush and the other main brush.

20. In an ignition system for internal combustion engines, in combination, a generator having main brushes and a battery connected thereto, a third brush displaced from said main brushes, an ignition circuit connected between said third and one of said main brushes, said third brush being disposed near the neutral axis for a relatively high speed of said generator, and automatic means between said battery and said generator, to disconnect said ignition circuit from said generator, and to permit the battery under certain conditions to energize said ignition circuit.

21. In an ignition system, in combination, a variable speed generator having three brushes, a battery connected to two of said brushes when the generator is operating above a certain speed, translating devices connected to said battery, means whereby the combined current derived from said generator by said battery and said translating devices is substantially constant for different speeds, and an ignition circuit connected between said third brush and one of said main brushes, said last named brushes being located so that the voltage between them is substantially that of the generator terminals at relatively low speeds and proportional to the optimum ignition voltage for higher speeds when said battery is connected to said generator.

22. In an electric system of distribution, in combination, a variable speed generator, a field coil adapted to cause current flow in the armature diminishing with increasing speed, means compensating for said diminution of current, and means so connected to said generator as to draw therefrom at relatively low speed a current of a voltage substantially that of the generator terminals, and at higher speeds a current of a voltage rising with such speed.

23. In an ignition system, in combination, a variable speed generator, having two main brushes, a battery connected to derive current from said brushes, a field circuit across said brushes, a third brush, a second field circuit connected between said third brush and one of said main brushes, a fourth brush between the low-speed neutral axis of said generator and said third brush, and an ignition circuit connected between said fourth brush and that brush which is at the greatest electrical angle from said fourth brush.

24. In an ignition system, for motor vehicle engines, in combination, a variable speed four pole generator, having a first and second main brush substantially in low speed neutral position, an ignition brush at a different potential from said main brushes, and spaced from said first brush in the direction of rotation thereof by less than the width of two commutator bars, an ignition circuit between said ignition brush and said second main brush, an auxiliary field brush, connected to a point between which and one of said main brushes the magnetic flux diminishes with increasing speed, a field coil between said last named brushes, and a second field coil between said main brushes.

25. In an ignition system, in combination, a generator, means adapted to maintain substantially constant a function of the output of said generator as its speed varies, a battery, an automatic switch connected between said generator and said battery adapted to operate at a voltage higher than that of the battery, so the generator may charge the battery and to operate in the opposite sense at a voltage lower than that of the battery, to prevent material discharge of said battery through said generator, and an ignition circuit connected to derive current from said battery when said automatic switch is open, and to derive from said generator when said switch is closed, a current of a voltage varying with the speed of the engine, in substantially the same ratio as the optimum voltage for ignition varies with said speed.

26. In a system of distribution, in combination, a variable speed dynamo, one or more external circuits having constant impedance and one or more external circuits having impedance varying with the speed of the dynamo and means whereby said dynamo supplies each of said circuits with a substantially constant current at all speeds above that at which the dynamo generates.

27. In an internal combustion engine for motor vehicles, a current generating and ignition system comprising in combination, a generator having means for regulating one function of its output as the speed varies, an ignition circuit connected with said generator to derive therefrom a current of a voltage increasing as the speed increases and means for automatically decreasing the strength of the ignition spark as the engine grows hotter.

28. A current generating and ignition system, comprising in combination, a generator, means for regulating one function of its output as the speed varies, an ignition circuit connected with said generator to derive therefrom a voltage increasing as the speed increases, and means for automatically lowering the ignition current as the generator grows hotter.

29. In an internal combustion engine for motor vehicles, a current generating and ignition system comprising in combination, a generator, means for regulating its current output to remain substantially constant for different speeds, and to decrease for increasing temperatures, and ignition apparatus associated with said generator to derive therefrom a current varying substantially proportionally to the current output of said generator and having a voltage rising with increasing speeds.

In testimony whereof, I have signed my name to this specification this 21st day of April, 1917.

LIONEL M. WOLFFSOHN.